United States Patent [19]

Albrecht et al.

[11] Patent Number: 5,251,844
[45] Date of Patent: Oct. 12, 1993

[54] GIMBALED COMPLIANT GUIDE FOR TAPE DRIVERS

[75] Inventors: Thomas R. Albrecht, San Jose; Jaquelin K. Spong, Mt. View; James H. Eaton, Morgan Hill, all of Calif.

[73] Assignee: International Business Machines Corporation, Armonk, N.Y.

[21] Appl. No.: 936,714

[22] Filed: Aug. 31, 1992

Related U.S. Application Data

[63] Continuation of Ser. No. 628,503, Dec. 17, 1990, abandoned.

[51] Int. Cl.⁵ .................. B65H 27/00; G03B 1/04
[52] U.S. Cl. .................... 242/179; 226/198; 242/76
[58] Field of Search .............. 242/76, 179; 226/190, 226/194, 196, 198

[56] References Cited

U.S. PATENT DOCUMENTS

| | | | |
|---|---|---|---|
| 3,074,310 | 1/1963 | Kotte et al. | 226/196 X |
| 3,317,104 | 5/1967 | Hughes et al. | 226/183 |
| 3,443,273 | 5/1969 | Arch | 226/198 X |
| 3,608,796 | 9/1971 | Morse et al. | 226/21 |
| 3,643,849 | 2/1972 | Roberts | 226/199 X |
| 3,744,696 | 7/1973 | Warren | 226/196 X |
| 3,768,717 | 10/1973 | Salcedo | 242/76 X |
| 3,831,831 | 8/1974 | Flippen, Jr. et al. | 242/76 X |
| 3,849,794 | 11/1974 | Arimura et al. | 242/76 X |
| 3,944,122 | 3/1976 | Pellicano | 226/198 |
| 3,949,919 | 4/1976 | Takei | 226/194 |
| 4,122,985 | 10/1978 | Nelson | 226/181 |
| 4,167,765 | 9/1979 | Watrous | 360/103 |
| 4,403,720 | 9/1983 | Grant | 226/190 |
| 4,518,134 | 5/1985 | Oishi et al. | 242/199 |
| 4,573,619 | 3/1986 | Grant | 242/76 X |
| 4,770,550 | 9/1988 | Takahashi | 384/495 |

FOREIGN PATENT DOCUMENTS

| | | |
|---|---|---|
| 0072466 | 8/1981 | European Pat. Off. |
| 2284546 | 9/1975 | France |
| 2373853 | 12/1977 | France |
| 454584 | 11/1972 | U.S.S.R. .................. 242/76 |
| 553670 | 5/1977 | U.S.S.R. .................. 242/76 |

OTHER PUBLICATIONS

E. S. Johnson, "Complaint Tape Guide", Jul. 1971, IBM Tech. Discl. Bulletin, vol. 14, No. 2, p. 399.

D. E. Griffiths, "Continuous Complaint Tape Guide," Jan. 1973, IBM Tech. Discl. Bulletin, vol. 15, No. 8, p. 2502.

J. W. Bradley, et al., "Web Slitting Device," Dec. 1974, IBM Tech. Discl. Bulletin, vol. 17, No. 7, pp. 1860–1861.

D. J. Winaski, "Tape Guiding Analysis", Apr. 1982, IBM Tech. Discl. Bulletin, vol. 24, No. 11B, pp. 5776–5777.

R. Andresen, et al., "Tape Guide Design", Dec. 1984, IBM Tech. Discl. Bulletin, vol. 27, No. 7B, pp. 4360–4361.

D. W. Johnson, "Antimodal Complaint Tape Guide", Dec. 1983, IBM Tech. Discl. Bulletin, vol. 26, No. 7A, p. 3398.

(List continued on next page.)

Primary Examiner—Stanley N. Gilreath
Assistant Examiner—John Rollins
Attorney, Agent, or Firm—M. W. Schecter

[57] ABSTRACT

A gimbaled compliant guide for tape drives includes two plates mounted adjacent opposite edges of an arcuate tape bearing surface. The plates are pivotably mounted to accommodate variances in the tape path resulting from tape path tolerances and tape distortions. One plate is also mounted to a leaf spring to accommodate variations in tape width. The combination of simple compliancy and the ability to pivot eliminates the concentration of the stress at a single contact point between the tape edge and the guiding mechanism. By evenly distributing the stress along the span of contact between the edge of the tape and the guides, particulate matter generated from such contact is minimized. Such guiding mechanism may be used on any element of the tape path.

25 Claims, 2 Drawing Sheets

OTHER PUBLICATIONS

J. A. Corradiini, et al., "Tape Guide Assemblies With Weighted Buttons", Aug. 1988, IBM Tech. Discl. Bulletin, vol. 31, No. 3, pp. 232–233.

D. J. Winarski, "Web Guiding Stress Functions", Sep. 1982, IBM Tech. Discl. Bulletin, vol. 25, No. 4, p. 2069.

S. T. Clegg, et al., "Complaint Tape Guide", Jul. 1982, IBM Tech. Discl. Bulletin, vol. 25, No. 2, pp. 809–810.

S. T. Clegg, et al., "Air Bearing Tape Guide", Jun. 1982, IBM Tech. Discl. Bulletin, vol. 25, No. 1, pp. 447–448.

R. Andresen, et al., "Tape Tension Control", Jun. 1982, IBM Tech. Discl. Bulletin, vol. 25, No. 1, pp. 444–446.

J. L. Garcia, et al., "Complaint Guide Assembly With High Wear Resistance Contact Pads", Oct. 1986, IBM Tech. Discl. Bulletin vol. 29, No.5, pp. 2126–2127.

E. G. Nassimbene, "Low-Inertia Head Moving Mechanism for Floppy Disk Drives", Mar. 1984, IBM Tech. Discl. Bulletin, vol. 26, No. 10B, pp. 5427–5428.

G. Chiu, et al., "Photoelectron Microscope for High Speed Integrated Circuit Testing and Ultrafast Electron Spectroscopy", IBM Tech. Discl. Bulletin, vol. 32, No. 3A, pp. 188–189, Aug. 1989.

C. H. Kalhoff, et al., "Servo Angle and Tape Measurement Fixture", Aug. 1978, IBM Tech. Discl. Bulletin, vol. 21, No. 3, pp. 915–916.

M. J. Balas, et al., "Modeling of Web-Roller Interactions and Lateral Web Dynamics", American Institute of Aeronautics and Astronautics, Inc. 1987, pp. 307–313.

D. J. Winarski, "Complaint Cleaner Blade Tape Guide" Aug. 1989, IBM Tech. Discl. Bulletin, vol. 32, No. 3B, pp. 175–176.

Research Disclosure No. 191 Mar. 1980, Harant GB p. 129; J. E. Morse: Web Edge Guide.

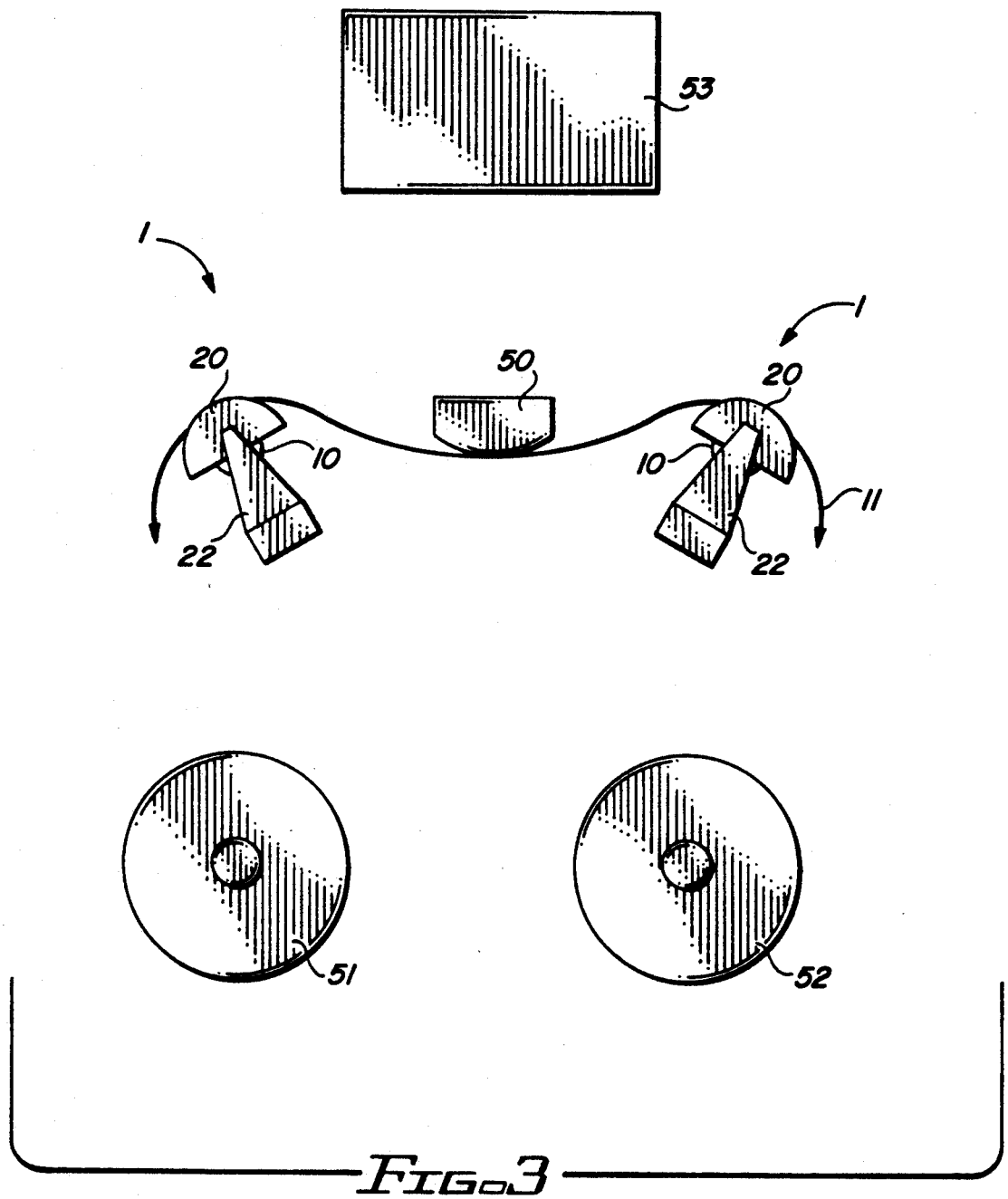

GIMBALED COMPLIANT GUIDE FOR TAPE DRIVERS

This application is a continuation of application Ser. No. 07/628,503, filed Dec. 17, 1990, now abandoned.

BACKGROUND OF THE INVENTION

1. Field of the Invention

The present invention relates to a gimbaled compliant guide for tape drives. More particularly, the invention is a compliant guide which is pivotably mounted to accommodate variance in the path of a moving tape.

2. Discussion of the Related Art

Web and tape guiding apparatus are well known. Perhaps the most common use of such an apparatus is for guiding tapes in magnetic tape drives over a magnetic read/write head. Guiding of the tape over the head is critical to the writing of data to and the reading of data from the magnetic tape. A typical magnetic tape drive includes several elements in the tape path to ensure proper alignment and operation of the tape and head. For example, the tape path of the IBM 3480/3490 tape drives includes a supply reel inside a tape cartridge, a vibration decoupler, a cleaner blade, an arcuate supply side air bearing surface, a magnetic read/write head, an arcuate storage side air bearing surface, a tension transducer, a storage reel, and tape edge guides along the sides of the bearing surfaces. The tape guides physically align the lateral position (i.e. in the direction of the tape width) and slope (i.e. the change in height of the tape over the bearing surface) of the tape relative to the read/write head. Lateral positioning maintains proper alignment between the read/write elements of the head and the data tracks on the magnetic tape. Slope control minimizes the skew between bits written on the tape and the recording elements of the read/write head. The tape guides are located along the arcuate bearing surfaces because the tape in such proximity can support a larger guiding force without collapsing than can a freely suspended tape.

Different types of edge guides are known. One known type of edge guide is a fixed open channel guide, in which rigid flanges are attached to the tape bearing surfaces. The flanges are fixed in position and physically contact the edge of the tape to align the tape relative to the read/write head. Because the flanges are fixed, the distance between them must be large enough to accommodate the width of the tape, which varies as a result of manufacturing tolerances. To accommodate the maximum width of the tape there must be considerable lateral "play" of the tape between the flanges, resulting in sloppy positioning of the tape and thereby burdening the head servo also maintaining proper alignment between the read/write elements of the head and the data tracks on the magnetic tape.

One type of open channel guide includes a roller with parallel edge guiding flanges. The roller can pivot axially to change the direction of tape movement. The flanges are fixed to the roller, resulting in the aforementioned problems. Examples of pivoting rollers are disclosed in U.S. Pat. Nos. 4,770,550; 4,51S,134; 4,403,720; 4,122,985; 3,949,919; and 3,608,796.

An alternative to fixed guides which eliminates the lateral play between the tape and the head is referred to as a "compliant" edge guide. Such a guide uses a leaf spring or other laterally compliant mechanism to maintain the tape in contact with an opposing, fixed edge guide. The compliance of the guide accommodates variations in tape width, as well as variations in tape slope due to imperfect or changing tape path alignment. Examples of compliant guides are disclosed in U.S. Pat. No. 3,317,104, and in the following articles published in the IBM Technical Disclosure Bulletin: Johnson, "Compliant Tape Guide", Vol. 14, No. 2, July 1971, p. 399; Griffiths, "Continuous Compliant Tape Guide", Vol. 15, No. 8, January 1973, p. 2502; Bradley et al., "Web Slitting Device", Vol. 17, No. 7, December 1974, pp. 1860-61; Winarski, "Tape Guiding Analysis", Vol. 24, No. 11b, April 1982, pp. 5776-77; Andresen et al., "Tape Guide Design", Vol 27, No. 7B, December 1984, pp. 4360-61; Johnson et al., "Antimodal Compliant Tape Guide", Vol. 26, No. 7A, December 1983, p. 3398; Corradini et al., "Tape Guide Assemblies with Weighted Buttons", Vol. 31, No. 3, August 1988, pp. 232-233; Winarski, "Web-Guiding Stress Functions", Vol. 25, No. 4, September 1982, p. 2069; Clegg et al., "Compliant Tape Guide", Vol. 25, July 1982, pp. 809-810; Clegg et al., "Air Bearing Tape Guide", Vol. 25, No. 1, June 1982, pp. 447-48; Andresen et al., "Tape Tension Control", Vol. 25, No. 1, June 1982, pp. 444-46.

Perhaps the most well known of the compliant tape guides is shown in Garcia et al., "Compliant Guide Assembly with High Wear Resistance Contact Pads", Vol. 25, No. 5, October 1986, pp. 2126-27, which discloses the laterally compliant tape guides used in the IBM 3480/3490 tape drives. These compliant guides include wear resistant contact pads made from a material such as ferrite or alumina to prevent them from abrading and thereby contaminating the tape drive. The pads are mounted at the ends of stainless steel leaf springs such that the pads are adjacent the arcuate bearing surfaces to engage the edge of the tape as it passes thereover, and to gently urge the tape into proper lateral position.

A heretofore unrecognized problem with both fixed and compliant edge guides is their inability to comply with changes in the slope of the tape caused by alterations in the tape path, such as a wobbling tape reel. More specifically, if the guiding flange or contact pad does not lie in the plane formed by the arc of the tape edge over the bearing surface, contact between the tape edge and the flange may occur at a single point rather than along the entire span of the guide. Single point contact concentrates the stress on the tape and may result in tape wear and the generation of particulate matter. Such particulate matter in the tape path abrades the magnetic head, resulting in a loss of signal amplitude and separation of the head and tape (referred to as "dropout").

SUMMARY OF THE INVENTION

In view of the foregoing, the principle object of this invention is an improved web guiding mechanism.

Another object of this invention is a compliant guiding mechanism for flexible tapes which accommodates changes in tape width and other parameters affecting the tape path, such as misalignment of tape path components due to manufacturing tolerances, distortions in the tape, etc.

Yet another object of this invention is a compliant guiding mechanism for flexible tapes which minimizes the generation of particulate matter.

These and other objects of the invention are accomplished using a gimbaled compliant guide. The guide includes two plates mounted adjacent opposite edges of an arcuate surface. Both plates are pivotably mounted to accommodate variances in the tape path resulting from tape path tolerances and tape distortions. One plate is also mounted to a leaf spring to accommodate variations in tape width. The other plate pivots about a fixed point. The combination of simple compliancy and the ability to pivot eliminates the concentration of stress at a single contact point between the tape edge and the guiding mechanism. By evenly distributing the stress along the span of contact between the guide and the edge of the tape, particulate matter generated from such contact is minimized. Such guiding mechanism may be used on any element in the tape path.

The foregoing and other objects, features and advantages of the invention will be apparent from the following more particular description of the preferred embodiment of the invention as illustrated in the accompanying drawing.

BRIEF DESCRIPTION OF THE DRAWING

FIG. 3 is a top view of a tape path including the guide of FIGS. 1 and 2.

DETAILED DESCRIPTION OF THE PREFERRED EMBODIMENT

Figure 1:
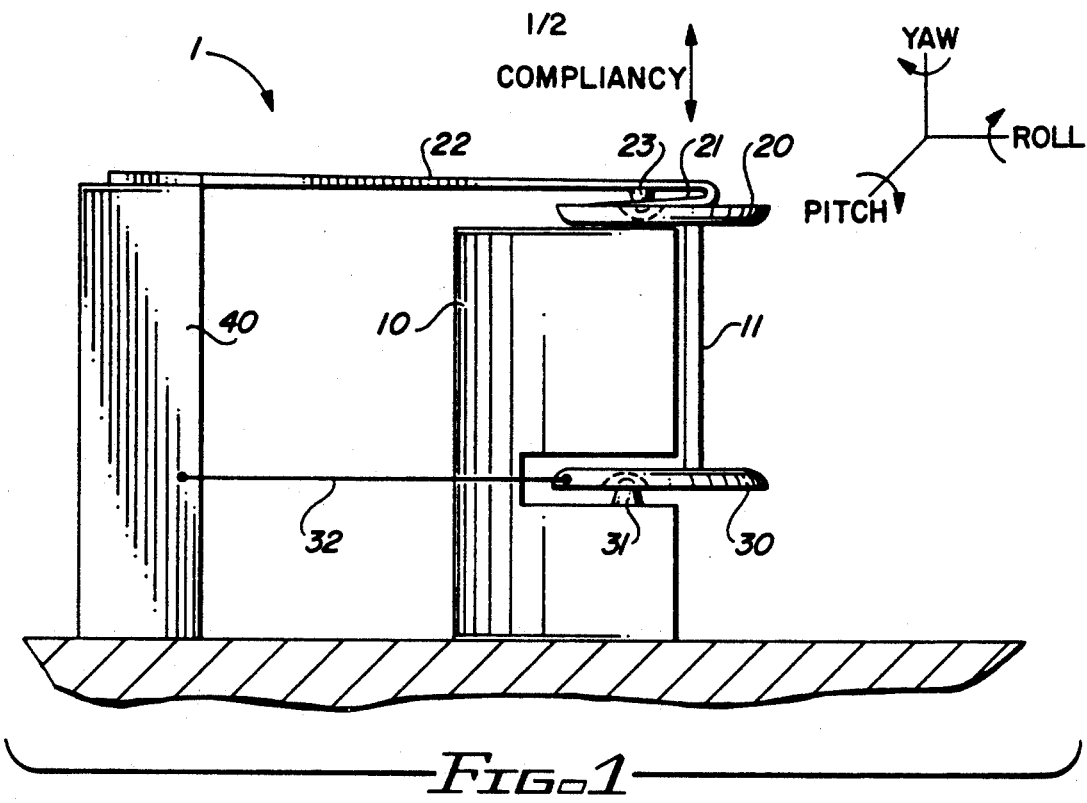
FIG. 1 is a side view of a tape guide, including the tape being guided, according to the invention.

Referring now more particularly to the drawing, like numerals denote like features and structural elements in the various figures. The invention will be described as practiced in a magnetic tape drive. It should be understood that the invention may also be practiced in a variety of other environments requiring the movement of a flexible web.

Figure 2:
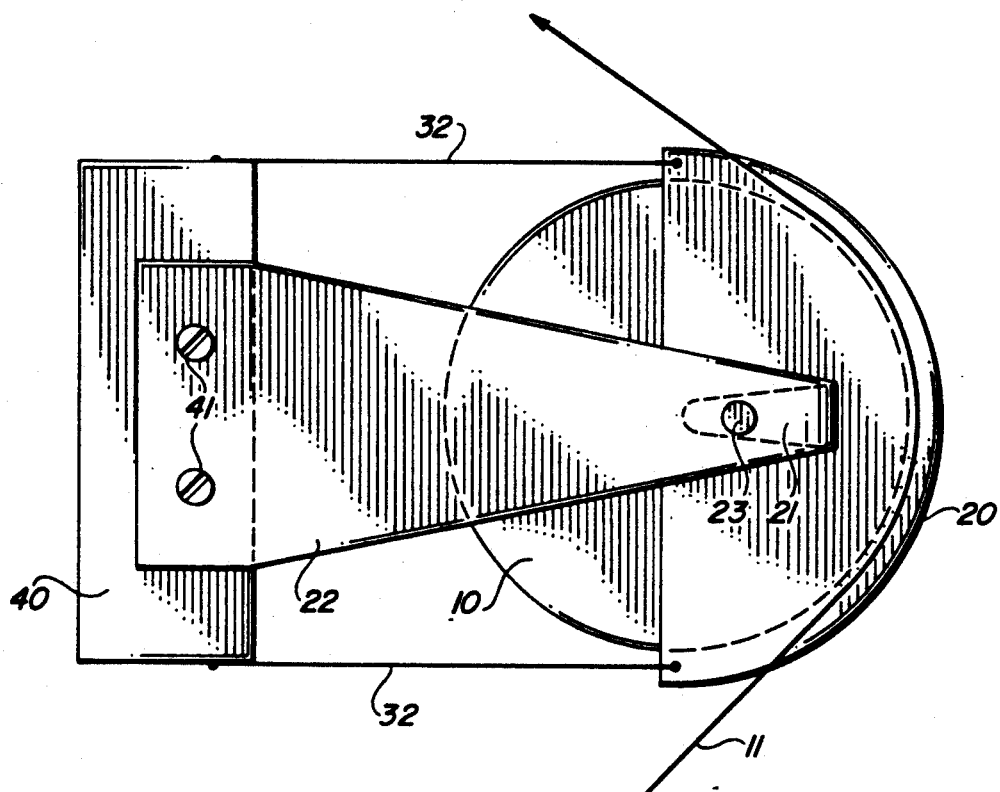
FIG. 2 is a top view of the guide of FIG. 1.

Referring to FIGS. 1 and 2, a tape guide 1 will now be described. Tape guide 1 includes a cylindrical (or otherwise curved surface) post 10 which provides an arcuate bearing surface for tape 11. Guide 1 also includes an upper plate 20 and lower plate 30 for edge guiding tape 11 via contact therewith. Plates 20 and 30 are manufactured from wear-resistant materials such as ferrite or alumina ceramics, stainless steel, or other materials to minimize the generation of particulate matter. The wear of plates 20 and 30 is also reduced by rounding the edges thereof which may contact the tape.

Upper plate 20 is mounted to a flexure portion 21 of a leaf spring 22 which is in turn fastened to a mount block 40. Leaf spring 22, including flexure 21, is manufactured from thin gauge stainless steel for adequate flexibility. Flexure 21 is shown as an integral part of leaf spring 22, but could be manufactured separately and attached thereto via spot welding. As shown, leaf spring 22 is fastened to mount block 40 by threaded screws 41, but such fastening could also be achieved using epoxy adhesives, spot welds, or other securing techniques. Guide 1 is made compliant by leaf spring 22, allowing upper plate 20 to move toward or away the edge of tape 11. In normal use, upper plate 20 is in contact with the edge of tape 11 to gently urge into proper alignment in the tape path. Such compliancy accommodates variations in the width of tape 11 resulting from manufacturing tolerances.

Flexure 21 permits upper plate 20 to pivot (or "gimbal") with two degrees of freedom with respect to post 10. The two degrees of freedom are labeled as pitch and roll in FIG. 1. Pivoting occurs about a dimple 23 protruding from the lower surface of leaf spring 22, through an opening in flexure 21, and into a recessed region of upper plate 20. As shown, dimple 23 is exaggerated for clarity of detail. Leaf spring 22 prevents rotational motion of upper plate 20 in the plane defined by the arc of the edge of tape 11, labeled as yaw in FIG. 1.

The mechanism including upper plate 20, flexure 21, leaf spring 22, and pivot 23 is similar to the IBM 3380/3390 Direct Access Storage Devices (DASD) head suspension assembly. The major difference between the tape guide and the head suspension assembly is that in the head suspension assembly, upper plate 20 is a slider for flying the magnetic head above the surface of a magnetic disk. For further description of the head suspension assembly of the IBM 3380/3390 DASD, see U.S. Pat. No. 4,167,765 and Aoyagi et al., "Integrated Head Suspension Assembly", IBM TECHNICAL DISCLOSURE BULLETIN, Vol. 32, No. 3A, August 1989, pp. 175-176, both of which are hereby incorporated by reference.

Lower plate 30 is also mounted to pivot with two degrees of freedom. Lower plate 30 pivots about a polished, stainless steel ball bearing, pin, or jewel mounted in a recess of post 10 with an epoxy adhesive. Jewel 31 protrudes into a recess in the lower surface of lower plate 30. Two constraint ties 32 limit rotational motion of lower plate 30. Ties 32 are threads or strings of a sturdy material affixed to lower plate 30 and mount block 40 using an epoxy adhesive, spot welding, physical knotting, etc. In alternative embodiments, ties 32 may extend from lower plate 30 to post 10, or may be replaced by other motion limiting means. Ties 32 are loose enough to allow for pitch and roll of lower plate 30 while limiting yaw.

The ability of plates 20 and 30 to pivot allows guide 1 to accommodate variations in the planes formed by the upper and lower edges of tape 11 yet still maintain contact with tape 11 across its entire length, evenly distributing the force applied across the span of contact with the tape. Plates 20 and 30 remain substantially parallel to the edges of tape 11 and to each other, and are mounted to pivot at the centroid of force of contact with such tape. The centroid of force is the centroid of the arc of contact between the edges of tape 11 and plates 20 and 30. Such application of force results in an even distribution of force along the span of contact between the edges of tape 11 and plates 20 and 30. Plates 20 and 30 should be of low mass to minimize the effects of gravity and inertia. The pivot points of plates 20 and 30 should be as close as possible to the edges of tape 11 to minimize the torque on the plates due to the drag of the edges of tape 11.

Referring to FIG. 3, a tape drive tape path employing the invention will now be described. Tape 11 is maintained adjacent a magnetic tape head 50 by two gimbaled, compliant guides 1 including two arcuate tape bearing posts 10. Head 50 and/or and guides 1 may be located on either side of tape 11 so long as head 50 is between guides 1 along the tape path (i.e. the direction of tape movement). Guides 1 are as previously described but are shown in less detail for simplicity. Tape reels 51 and 52 drive the tape movement and provide for the supply and storage of tape 11 as it moves, depending upon the direction of such movement. Controller 53 is connected to head 50 and reels 51 and 52 to control tape movement and head operations to allow for writing to and reading from tape 11, as is known.

The connections to controller 53 are not shown for simplicity, but are also known.

The tape drive and tape cartridge can be arranged in different configurations. In one configuration, reels 51 and 52 are part of a tape cartridge and guides 1, head 50 and controller 53 are part of a tape drive in which the cartridge is mounted. In another configuration, one of the tape reels is included in the tape drive, as in the IBM 3480/3490 tape drives. In still another configuration guides 1 are included in the tape cartridge.

While the invention has been shown and described with reference to a preferred embodiment thereof, it will be understood by those skilled in the art that various changes in form and detail may be made therein without departing from the spirit, scope and teaching of the invention. For example, any number of gimbaled, compliant guides may be used to guide a tape, as required. The two plates of a guide need not be of the same shape. Leaf spring 22 may be replaced by gravity, electromechanical, or other compliant means. Furthermore, the tape need not be magnetic tape but may be any moving flexible web. Accordingly, the invention disclosed herein is to be limited only as specified in the following claims.

What is claimed is:

1. A guide for a flexible moving web comprising:
   an arcuate web bearing surface capable of bearing a web extending thereon, the web bearing surface having a first edge, the web having an edge forming an arc;
   a first plate pivotably mounted adjacent the first edge of the web bearing surface; and
   means for applying force upon the first plate in a direction substantially perpendicular to the plane defined by the arc of the edge of the web, the first plate mounted to pivot about a first pivot point on the means for applying force to the first plate, the first pivot point moveable in a direction substantially perpendicular to the plane defined by the arc of the edge of the web but constrained from moving on a surface of the first plate in a direction substantially parallel to the first plate.

2. The guide of claim 1 wherein the means for applying force upon the first plate is a leaf spring, the first plate mounted to pivot about a pivot point on the leaf spring.

3. The guide of claim 1 further comprising a second plate mounted to pivot about a second pivot point adjacent a second edge of the web bearing surface, the second pivot point not moveable in a direction substantially perpendicular to the plane defined by the arc of the edge of the web.

4. The guide of claim 3 wherein the first and second plates pivot with two degrees of freedom to remain substantially parallel to the plane defined by the arc of the edge of the web.

5. The guide of claim 3 wherein the first and second plates pivot at a centroid of an arc of contact between a respective plate and the web.

6. The guide of claim 3 wherein the first and second plates are substantially parallel.

7. The guide of claim 3 wherein the first and second plates are constrained from rotating in the plane defined by the arc of the edge of the web.

8. The guide of claim 1 wherein the first plate pivots with two degrees of freedom to remain substantially parallel to the plane defined by the arc of the edge of the web.

9. The guide of claim 1 wherein the first pivot point is constrained from moving on a surface of the first plate, in a direction substantially parallel to the first plate, by a recess in the surface of the first plate.

10. A guide for a flexible moving web comprising:
    an arcuate web bearing surface capable of bearing a web extending thereon, the web bearing surface having a first and a second edge, the web having an edge forming an arc;
    a first plate pivotably mounted adjacent the first edge of the web bearing surface;
    a second plate pivotably mounted adjacent a second edge of the web bearing surface; and
    means for applying force upon the first plate in a direction substantially perpendicular to the plane defined by the arc of the edge of the web, the first plate mounted to pivot about a pivot point on the means applying force to the first plate, the pivot point moveable in a direction substantially perpendicular to the plane defined by the arc of the edge of the web but constrained from moving on a surface of the first plate in a direction substantially parallel to the first plate by a recess in the surface of the first plate.

11. The guide of claim 10 wherein the means for applying force upon the first plate is a leaf spring, the first plate mounted to pivot about a pivot point on the leaf spring.

12. The guide of claim 10 wherein the first and second plates pivot with two degrees of freedom to remain substantially parallel to the plane defined by the arc of the edge of the web.

13. The guide of claim 10 wherein the first and second plates are substantially parallel.

14. The guide of claim 10 wherein the first and second plates are constrained from rotating in the plane defined by the arc of the edge of the web.

15. The guide of claim 10 wherein the first and second plates pivot only at a centroid of an arc of contact between a respective plate and the web.

16. A tape path comprising:
    a first and a second rotatable reel;
    a flexible tape having its first end wound upon the first rotatable reel and its second end wound upon the second rotatable reel;
    a guide along the length of the tape comprising:
       an arcuate tape bearing surface capable of bearing the tape thereon the tape bearing surface, having a first edge, the tape having an edge forming an arc;
       a first plate pivotably mounted adjacent the first edge of the tape bearing surface; and
       means for applying force upon the first plate in a direction substantially perpendicular to the plane defined by the arc of the edge of the tape, the first plate mounted to pivot about a first pivot point on the means for applying force to the first plate, the first pivot point moveable in a direction substantially perpendicular to the plane defined by the arc of the edge of the tape but constrained from moving on a surface of the first plate in a direction substantially parallel to the first plate.

17. The guide of claim 16 wherein the first pivot point is constrained from moving on a surface of the first plate, in a direction substantially parallel to the first plate, by a recess in the surface of the first plate.

18. The tape path of claim 16 wherein the means for applying a force upon the first plate is a leaf spring, the first plate mounted to pivot about a pivot point on the leaf spring.

19. The tape path of claim 18 further comprising a second plate pivotably mounted adjacent a second edge of the tape bearing surface.

20. The tape path of claim 16 further comprising a second plate mounted to pivot about a second pivot point adjacent a second edge of the tape bearing surface, the second pivot point not moveable in a direction substantially perpendicular to the plane defined by the arc of the edge of the tape.

21. A tape drive comprising:
a first and a second rotatable reel;
a flexible tape having its first end wound upon the first rotatable reel and its second end wound upon the second rotatable reel;
a read/write head adjacent the tape;
means coupled to the rotatable reels for controllably rotating the rotatable reels to advance the tape past the head;
means coupled to the head for controllably writing to and reading from the tape;
a first and a second guide, one guide on each side of the head along the length of the tape, the first guide comprising:
an arcuate tape bearing surface capable of bearing the tape thereon, the tape bearing surface having a first and a second edge, the tape having an edge forming an arc;
a first plate pivotably mounted adjacent the first edge of the tape bearing surface; and
means for applying force upon the first plate in a direction substantially perpendicular to the plane defined by the arc of the edge of the tape, the first plate mounted to pivot about a first pivot point on the means for applying force to first plate, the first pivot point moveable in a direction substantially perpendicular to the plane defined by the arc of the edge of the web but constrained from moving on a surface of the first plate in a direction substantially parallel to the first plate.

22. The tape drive of claim 21 further comprising a second plate mounted to pivot about a second pivot point adjacent a second edge of the tape bearing surface, the second pivot point not moveable in a direction substantially perpendicular to the plane defined by the arc of the edge of the tape.

23. The tape drive of claim 21 wherein the means for applying force upon the first plate is a leaf spring, the first plate mounted to pivot about a pivot point on the leaf spring.

24. The tape drive of claim 23 further comprising a second plate pivotably mounted adjacent a second edge of the tape bearing surface.

25. The guide of claim 21 wherein the first pivot point is constrained from moving on a surface of the first plate, in a direction substantially parallel to the first plate, by a recess in the surface of the first plate.

* * * * *

UNITED STATES PATENT AND TRADEMARK OFFICE
CERTIFICATE OF CORRECTION

PATENT NO. : 5,251,844
DATED : October 12, 1993
INVENTOR(S) : T. R. Albrecht, et al.

It is certified that error appears in the above-identified patent and that said Letters Patent is hereby corrected as shown below:

On the title page, item (54), and column 1, line 3:

In the title, the words "Tape Drivers" should be --Tape Drives--.

At column 6, line 18, the words "means applying force" should be --means for applying force--.

At column 7, line 2, the words "means for applying a force" should be --means for applying force--.

Signed and Sealed this

Fifth Day of April, 1994

Attest:

BRUCE LEHMAN

Attesting Officer

Commissioner of Patents and Trademarks